UNITED STATES PATENT OFFICE.

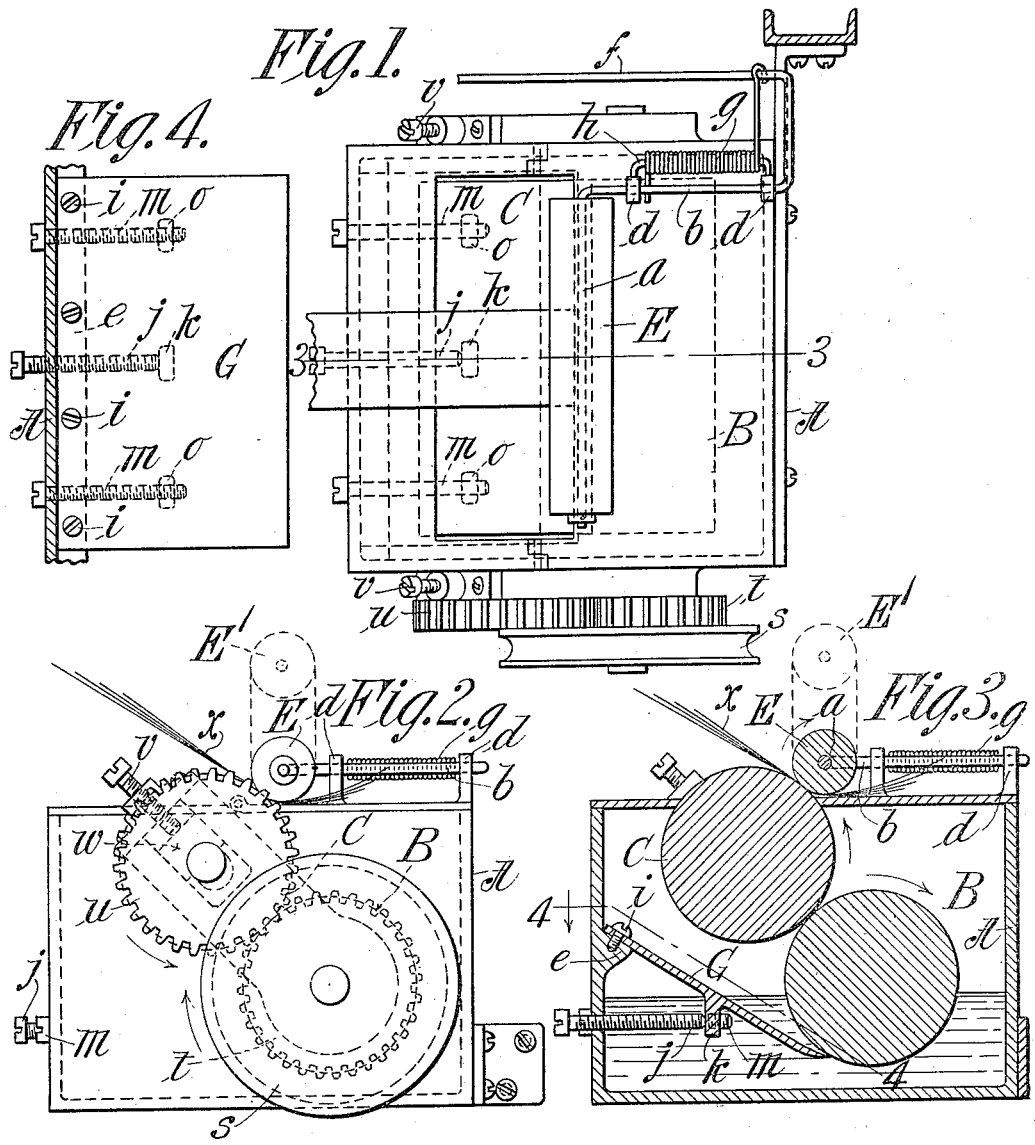

ALBERT P. WARD AND IRVING S. RUSSELL, OF SPRINGFIELD, MASSACHUSETTS.

GUMMING-MACHINE.

1,042,298.

Specification of Letters Patent.

Patented Oct. 22, 1912.

Application filed May 12, 1911. Serial No. 626,763.

*To all whom it may concern:*

Be it known that we, ALBERT P. WARD and IRVING S. RUSSELL, citizens of the United States of America, and residents of Springfield, in the county of Hampden and State of Massachusetts, have invented certain new and useful Improvements in Gumming-Machines, of which the following is a full, clear, and exact description.

This invention relates to a machine for gumming, at one time, a bunch or plurality of narrow bands such as used around bunches of envelops.

The principal object of the invention is to provide a simple and inexpensive machine which is half automatic in character and which includes in combination with a gum delivering roll, which has a constant rotary motion on a fixed axis, a pressure roll which is normally swung with its axis inclined to the axis of the gum delivering roll and out of contact with the latter so as not to become covered with gum when no bands are being passed through and between the pair of rollers,—there being means by which to force the pressure roll manually down onto the bands, and so that the latter will be pressed against the delivering roll in order that the end portions thereof may, as desired, receive the adhesive thereon.

Further objects of the invention are attained in and by the parts and mechanisms as hereinafter described.

In the drawings:—Figure 1 is a plan view of the machine. Fig. 2 is an end elevation. Fig. 3 is a central, vertical cross sectional view on line 3—3, Fig. 1. Fig. 4 is a partial horizontal sectional view on line 4—4, Fig. 3. Fig. 5 is a view showing the bands to be gummed, in their endwise overlapped relations.

In the drawings, A represents the gum box, B the gum supply roll partly submerged in the gum box, C the gum delivering roll in constant peripheral contact with the supply roll, and E the pressure roll.

It is to be particularly noted that the pressure roll is normally swung to an upwardly inclined position out of contact with the gum delivering roll so as not to become covered with gum when no bands are going through.

The pressure roll E is carried on the long member $a$ which is right angularly turned from the portion $b$, and which long rod like member ranges in a plane parallel with the axis of the gum delivering roll C; the portion $b$ is fulcrumed in the brackets $d\ d$ therefor, while the return bent portion $f$ constitutes a lever handle by which to force the pressure roll manually down onto the bands, represented at $x$, against the reaction of the spring $g$. Said spring,—a coil spring,—encircling the rod $h$ which is connected to the journal brackets $d\ d$, has one extremity thereof in engagement under the member $b$ while its other engages the return bent handle extension so that this spring, arranged as shown and described, or arranged in any other manner which may be manifestly desirable, is effective to cause a rocking of the portion $b$ in its journal box so as to throw the pressure roll carried by the member $a$ to an elevated position, as indicated by the dotted lines E′ in Figs. 2 and 3, the length of the roll being angular to the axis of the roll C.

The operative usually works with about five of the narrow envelop bands which are "fanned out" as represented in the drawings, that is the ends are made to slightly overlap so that at one end of the several bands the gum may be simultaneously applied therein preparatory to using them around bunches of envelops.

While the roll is in its upwardly swung, normal position, the bands are brought onto the distributing roll with narrow rear end portions against such rolls and about as represented in Fig. 3, and then by the hand lever portion $f$ the machine is so manually operated that the bands are pressed while forwardly running toward the operator who is holding them by the then downswung roller E,—it being understood that by suitable driving means the rolls B and C are constantly running in the direction of the arrows.

In conjunction with the gum supplying roll B is a "doctor" or scraper G. This doctor is made in the form of a blade held by screws $i$ on a flange $e$ therefor formed on the inner side of the gum box. The screw $j$ which is tapped through the wall of the gum box engages against the lug $k$ formed at and depending from the underside of the obliquely arranged doctor or scraper blade while the pair of screws $m\ m$ have screw threading engagements through the lugs $o\ o$ also formed as projections on the under side of the blade and so that by the manipulation of the screws the blade which is understood as being only semi-rigid may be forced or sprung to its most efficient edgewise relation to the periphery of the gum supply roll.

If the blade is in too close or hard pressure to the roll, the screws *m m* may be turned so as to ease off the blade, its adjustment being maintained by the properly set up screw *j*.

The gum supplying and gum delivering rolls B and C have for their concurrent rotations, in the present instance, means as follows:—On the arbor of the gum supplying roll B is a gear wheel *t*, and a driving pulley *s*; and on the arbor of the gum delivering roll C is a gear wheel *u* which is in constant mesh with the pulley driven gear wheel *t*; and the delivering roll C may be bodily adjusted for suitable pressure bearing in relation to the supply roll B by the well known expedient of the adjusting screws *v v* which are operative on the boxes *w* in which the journals of the delivery roll are carried.

We claim:—

In a gumming mechanism, in combination, a gum box provided with a rotatable gum delivering roll, and said box having journal brackets at an upper portion thereof, a rod like part having an intermediate portion thereof constituting a member journaled for a rocking movement in said journal brackets, having one extremity thereof extending at right angles to said journaled member and in a plane parallel with the axis of the gum delivering roll and having a pressure roll journaled thereon, said journaled member having a return bent opposite extremity terminating in a handle member whereby the pressure roll is normally swung to a position away from the periphery of the gum delivering roll.

Signed by us at Springfield, Mass., in presence of two subscribing witnesses.

ALBERT P. WARD.
IRVING S. RUSSELL.

Witnesses:
G. R. Driscoll,
Wm. S. Bellows.